US012611692B2

(12) United States Patent
　　Svec et al.

(10) Patent No.: US 12,611,692 B2
(45) Date of Patent: Apr. 28, 2026

(54) SYSTEMS AND METHODS FOR APPLYING DOTS OF DIFFERENT ADHESIVES TO MOVING ROOFING SHINGLE STOCK

(71) Applicant: BMIC LLC, Dallas, TX (US)

(72) Inventors: James A. Svec, Kearny, NJ (US); Olan T. Leitch, Mt. Juliet, TN (US)

(73) Assignee: BMIC LLC, Dallas, TX (US)

( * ) Notice: Subject to any disclaimer, the term of this patent is extended or adjusted under 35 U.S.C. 154(b) by 77 days.

(21) Appl. No.: 18/523,034

(22) Filed: Nov. 29, 2023

(65) Prior Publication Data

US 2024/0091804 A1　　Mar. 21, 2024

Related U.S. Application Data

(62) Division of application No. 17/191,898, filed on Mar. 4, 2021, now Pat. No. 11,865,569.

(Continued)

(51) Int. Cl.
| | |
|---|---|
| *B32B 3/10* | (2006.01) |
| *B05C 1/00* | (2006.01) |
| *B05C 1/02* | (2006.01) |
| *B05C 1/08* | (2006.01) |
| *B05C 1/16* | (2006.01) |
| *B05C 9/06* | (2006.01) |
| *B05C 13/02* | (2006.01) |
| *B05D 1/28* | (2006.01) |
| *B05D 1/34* | (2006.01) |
| *B05D 5/10* | (2006.01) |

(Continued)

(52) U.S. Cl.
CPC .............. *B05C 1/027* (2013.01); *B05C 1/003* (2013.01); *B05C 1/0808* (2013.01); *B05C 1/083* (2013.01); *B05C 1/165* (2013.01); *B05C*

*9/06* (2013.01); *B05C 13/02* (2013.01); *B05D 1/28* (2013.01); *B05D 1/34* (2013.01); *B05D 5/10* (2013.01); *C09J 7/38* (2018.01); *E04D 1/34* (2013.01); *B05C 3/20* (2013.01); *B05D 2252/04* (2013.01); *C09J 2301/122* (2020.08); *C09J 2301/208* (2020.08); *E04D 2001/3435* (2013.01); *E04D 2001/347* (2013.01); *E04D 2001/3491* (2013.01)

(58) Field of Classification Search
None
See application file for complete search history.

(56) References Cited

U.S. PATENT DOCUMENTS

| | | |
|---|---|---|
| 2,666,402 A | 1/1954 | Clarvoe |
| 3,003,906 A | 10/1961 | Fasold et al. |

(Continued)

FOREIGN PATENT DOCUMENTS

| | | |
|---|---|---|
| CA | 3023371 A1 | 11/2017 |

OTHER PUBLICATIONS

Photographic Image. Copyrighted 2010 by InspectAPedia.com.

*Primary Examiner* — Christopher M Polley
(74) *Attorney, Agent, or Firm* — VENABLE LLP

(57) ABSTRACT

Systems and methods of applying self-seal strips of multiple different adhesives are disclosed. In one embodiment, two spaced apart spoked applicator wheel assemblies are positioned beneath a web of moving shingle stock such that each of the applicator wheels applies dots of different adhesives in an alternating pattern. In other embodiments, a layer of a second adhesive is deposited onto previously applied dots of a first adhesive to form layered adhesive dots with dual properties of both adhesives.

20 Claims, 6 Drawing Sheets

Related U.S. Application Data

(60) Provisional application No. 62/985,607, filed on Mar. 5, 2020.

(51) Int. Cl.

| | |
|---|---|
| *C09J 7/38* | (2018.01) |
| *E04D 1/34* | (2006.01) |
| *B05C 3/20* | (2006.01) |

(56) References Cited

U.S. PATENT DOCUMENTS

| | | | |
|---|---|---|---|
| 3,080,683 A | 3/1963 | Sallie | |
| 3,138,897 A | 6/1964 | Mccorkle | |
| 3,239,992 A | 3/1966 | Hodgson | |
| 3,247,631 A | 4/1966 | Lovness | |
| 3,252,257 A | 5/1966 | Price et al. | |
| 3,641,932 A | 2/1972 | Behringer | |
| 4,189,886 A | 2/1980 | Frohlich et al. | |
| 4,287,846 A | 9/1981 | Klein | |
| 4,439,955 A | 4/1984 | Freiborg | |
| 4,470,237 A | 9/1984 | Lincoln et al. | |
| 4,835,929 A | 6/1989 | Bondoc et al. | |
| 5,094,042 A | 3/1992 | Freborg | |
| 5,122,095 A | 6/1992 | Wolfert | |
| 5,239,802 A | 8/1993 | Robinson | |
| 5,271,201 A | 12/1993 | Noone et al. | |
| 5,288,269 A | 2/1994 | Hansen | |
| 5,377,459 A | 1/1995 | Freiborg | |
| 5,419,941 A | 5/1995 | Noone et al. | |
| 5,693,142 A | 12/1997 | Pedigrew et al. | |
| 5,921,863 A | 7/1999 | Sells | |
| 5,950,387 A | 9/1999 | Stahl et al. | |
| D422,095 S | 3/2000 | Thagard, III et al. | |
| 6,083,592 A | 7/2000 | Chich | |
| 6,125,602 A | 10/2000 | Freiborg et al. | |
| 6,298,613 B1 | 10/2001 | Coulton et al. | |
| 6,305,138 B1 | 10/2001 | Stahl et al. | |
| 6,308,472 B1 | 10/2001 | Coulton et al. | |
| 6,351,913 B1 | 3/2002 | Freiborg et al. | |
| 6,361,434 B1 | 3/2002 | Brandon | |
| 6,813,866 B2 | 11/2004 | Naipawer, III | |
| 6,981,916 B2 | 1/2006 | Coulton | |
| 7,204,063 B2 | 4/2007 | Kandalgaonkar | |
| 7,594,363 B2 | 9/2009 | Polumbus et al. | |
| 7,604,536 B2 | 10/2009 | Coulton et al. | |
| 7,921,606 B2 | 4/2011 | Quaranta et al. | |
| 8,137,757 B2 | 3/2012 | Collins et al. | |
| 8,240,100 B2 | 8/2012 | Kalkanoglu et al. | |
| 8,266,861 B2 | 9/2012 | Koch et al. | |
| 8,371,072 B1 | 2/2013 | Shanes et al. | |
| 8,371,085 B2 | 2/2013 | Koch | |
| 8,453,408 B2 | 6/2013 | Kalkanoglu et al. | |
| 8,613,165 B2 | 12/2013 | Bleil et al. | |
| 8,820,020 B2 | 9/2014 | Koch et al. | |
| 8,820,021 B2 | 9/2014 | Kalkanoglu et al. | |
| 8,839,576 B1 | 9/2014 | Newcomb | |
| 8,898,987 B1 | 12/2014 | Amatruda et al. | |
| 8,915,037 B2 | 12/2014 | Jenkins | |
| 9,017,791 B2 | 4/2015 | Grubka et al. | |
| 9,097,020 B2 | 8/2015 | Grubka et al. | |
| 9,151,055 B2 | 10/2015 | Grubka | |
| 9,200,453 B2 | 12/2015 | Kerwood-Winslow et al. | |
| 9,290,943 B2 | 3/2016 | Grubka et al. | |
| 9,428,916 B2 | 8/2016 | Railkar et al. | |
| 9,482,007 B2 | 11/2016 | Grubka et al. | |
| 9,758,970 B2 | 9/2017 | Grubka et al. | |
| 9,795,981 B2 | 10/2017 | Svec | |
| 10,196,823 B2 | 2/2019 | Rotter | |
| 10,253,502 B2 | 4/2019 | Grube et al. | |
| 10,358,824 B2 | 7/2019 | Aschenbeck et al. | |
| 10,538,918 B2 | 1/2020 | Aschenbeck et al. | |
| 10,544,590 B2 | 1/2020 | Jenkins | |
| 10,787,814 B2 | 9/2020 | Duque et al. | |
| 10,907,352 B2 | 2/2021 | Aschenbeck et al. | |
| 11,203,871 B2 | 12/2021 | Duque et al. | |
| 11,391,046 B2 | 7/2022 | Aschenbeck et al. | |
| 2002/0000068 A1 | 1/2002 | Freiborg et al. | |
| 2002/0032000 A1 | 3/2002 | Lawless, III et al. | |
| 2003/0093958 A1 | 5/2003 | Freiborg et al. | |
| 2003/0215594 A1 | 11/2003 | Hamdar et al. | |
| 2004/0206012 A1 | 10/2004 | Pressutti et al. | |
| 2005/0126088 A1 | 6/2005 | Rotter | |
| 2005/0193673 A1 | 9/2005 | Rodrigues et al. | |
| 2006/0096189 A1 | 5/2006 | Pavlansky et al. | |
| 2006/0265990 A1 | 11/2006 | Kalkanoglu et al. | |
| 2007/0266665 A1 | 11/2007 | Todd et al. | |
| 2008/0220714 A1 | 9/2008 | Caruso et al. | |
| 2010/0192500 A1 | 8/2010 | Koch | |
| 2010/0192501 A1 | 8/2010 | Koch et al. | |
| 2011/0005158 A1 | 1/2011 | Kailey et al. | |
| 2011/0061326 A1 | 3/2011 | Jenkins | |
| 2011/0072752 A1 | 3/2011 | Aschenbeck et al. | |
| 2011/0126485 A1 | 6/2011 | Bleil et al. | |
| 2011/0151170 A1 | 6/2011 | Grubka et al. | |
| 2013/0025225 A1 | 1/2013 | Vermilion et al. | |
| 2013/0042540 A1 | 2/2013 | Atchley | |
| 2014/0179220 A1 | 6/2014 | Railkar et al. | |
| 2015/0089895 A1 | 4/2015 | Leitch | |
| 2016/0024792 A1 | 1/2016 | Grubka et al. | |
| 2016/0186438 A1 | 6/2016 | Montojo et al. | |
| 2017/0321423 A1* | 11/2017 | Aschenbeck | E04D 1/29 |
| 2018/0030732 A1 | 2/2018 | Duque et al. | |
| 2018/0087274 A1 | 3/2018 | Grubka et al. | |
| 2018/0163405 A1 | 6/2018 | Grubka | |
| 2019/0360208 A1 | 11/2019 | Collins et al. | |
| 2020/0040582 A1 | 2/2020 | Boss et al. | |
| 2020/0190804 A1 | 6/2020 | Haynes et al. | |
| 2020/0325684 A1 | 10/2020 | Duque et al. | |
| 2021/0108416 A1 | 4/2021 | Aschenbeck et al. | |
| 2021/0214945 A1 | 7/2021 | Leitch | |
| 2022/0178143 A1 | 6/2022 | Duque et al. | |
| 2022/0275645 A1 | 9/2022 | Duque et al. | |
| 2022/0282487 A1 | 9/2022 | Leitch | |
| 2022/0307261 A1 | 9/2022 | Aschenbeck et al. | |

* cited by examiner

SYSTEMS AND METHODS FOR APPLYING DOTS OF DIFFERENT ADHESIVES TO MOVING ROOFING SHINGLE STOCK

REFERENCE TO RELATED APPLICATION

The present Patent Application is a divisional application of U.S. Non-Provisional application Ser. No. 17/191,898, entitled "Systems and Methods For Applying Dots Of Different Adhesives to Moving Roofing Shingle Stock" filed Mar. 4, 2021, which claims the benefit of U.S. Provisional Application No. 62/985,607, filed Mar. 5, 2020, which are incorporated herein by reference in their entireties for all purposes.

INCORPORATION BY REFERENCE

The disclosures made in U.S. Provisional Application No. 62/985,607, filed Mar. 5, 2020, are specifically incorporated by reference herein as if set forth in their entirety.

TECHNICAL FIELD

This disclosure relates generally to roofing shingle manufacturing and more specifically to the application of self-seal strips to a moving web of roofing shingle stock.

BACKGROUND

Self-seal strips of adhesive commonly are applied to shingle stock as the stock is conveyed along a manufacturing path. Self-seal strips typically comprise lines or linear arrays of adhesive dots separated by spaces. A need exists for applying self-seal strips comprising alternating dots of different adhesives with different tacking temperatures (or other properties) at higher line speeds. A need also exists for more effective application of a second different adhesive layer onto previously applied adhesive dots of a first adhesive to form multi-layer adhesive dots with dual properties, again at higher line speeds. It is to the provision of systems and methods that meet these and other needs that the present disclosure is primarily directed.

SUMMARY

Briefly described, a system and method are disclosed for applying a self-seal strip of adhesive materials comprising alternating dots of different adhesives that have different adhesive properties to a shingle stock. For example, different adhesives having different adhesive properties such as an ability to tack at different temperatures or other different properties can be applied. In embodiments, two applicator assemblies are disposed beneath the moving shingle stock, the second applicator assembly being downstream of the first applicator assembly. The first applicator assembly includes a first applicator wheel that applies a linear array of adhesive dots of a first adhesive material, with spaces between the dots of the first adhesive. In some embodiments, the second applicator assembly can include a second applicator wheel synchronized with the first applicator wheel so that it applies a second array of adhesive dots of a second, different adhesive material to the moving shingle stock within the spaces between the dots of the linear array of first adhesive dots. Other patterns of application of the first and second adhesives also can be provided. The applicator wheels can operate at higher rotation rates to accommodate higher line speeds.

Also disclosed are systems and methods of applying a second, different adhesive onto previously applied dots of a first adhesive as roofing shingle stock moves along a processing path. In one embodiment, a second applicator assembly is adjusted so that adhesive coated portions thereof just kiss previously applied adhesive dots of the first adhesive to deposit the second adhesive thereon. In another embodiment, an adhesive die is disposed beneath the moving shingle stock, aligned with previously applied dots of a first adhesive being carried by the moving shingle stock. The second, different adhesive is pumped through the die so that a small puddle of the second adhesive is maintained atop the die. The previously applied first adhesive dots move through the puddle and pick up a layer of the second adhesive to form multi-adhesive dots, which define seal-seal strips for shingles or other roofing materials formed from the shingle stock.

Various aspects of the present disclosure further include, without limitation, a system comprising a conveyance system for conveying a web of shingle stock along a path; a first applicator assembly positioned along the path of the web of shingle stock, the first applicator assembly configured to apply a linear array of dots of a first adhesive to the web of shingle stock; and a second applicator assembly positioned along the path of the web of shingle stock downstream from the first applicator assembly, the second applicator assembly configured to apply a second adhesive to the web of shingle stock along the linear array of dots of the first adhesive. In some embodiments, the first adhesive comprises a self-seal adhesive material having first adhesive properties and the second adhesive comprises a self-seal adhesive having second adhesive properties that are different from the first adhesive properties of the first adhesive. The application of the first adhesive and the second adhesive forms a multi-adhesive self-seal strip having different adhesive properties along the web of shingle stock.

In some embodiments, the system further comprises a stabilizer assembly located along the path of the web of shingle stock. In some embodiments, the stabilizer assembly includes a stabilizer wheel on one side of the web of shingle stock and aligned opposing supports on another side of the web of shingle stock. In other embodiments, the stabilizer assembly can comprise a stabilizer wheel under which the web of shingle stock travels, flanked by a plurality of rollers over which the web of shingle stock travels.

In some embodiments of the system, the first applicator assembly comprises a first applicator wheel having a plurality of spokes configured to apply the dots of the first adhesive, and the second applicator assembly comprises a second applicator wheel configured to rotate in synchronization with the first applicator wheel to apply the second adhesive to the web of shingle stock between the dots of the first adhesive applied to the web of shingle stock by the first applicator assembly.

In other embodiments of the system, the first applicator assembly comprises a first applicator wheel having a plurality of spokes configured to apply the dots of the first adhesive, and the second applicator assembly comprises a second applicator wheel configured to rotate in synchronization with the first applicator wheel to apply the second adhesive to the web of shingle stock along the dots of the first adhesive applied to the web of shingle stock by the first applicator assembly.

In further embodiments of the system, the second applicator assembly comprises a puddle die in communication with an adhesive supply, the puddle die including a top portion configured to maintain a puddle of the second adhesive in a position adjacent the web of shingle stock such that the dots of the first adhesive engage the puddle of the second adhesive to pick up a layer of the second adhesive as the dots of the first adhesive pass along the puddle die.

In embodiments, the first applicator assembly can comprise an applicator wheel having a plurality of spokes and an adhesive die configured to deposit the first adhesive onto each of the spokes of the applicator wheel. In still other embodiments of the system, the second applicator assembly can comprise an applicator wheel having a plurality of spokes and an adhesive die configured to deposit the second adhesive onto each of the spokes of the applicator wheel.

In some embodiments, the first applicator assembly comprises a first applicator wheel and the second applicator assembly comprises a second applicator wheel. The first applicator wheel, the second applicator wheel, or both, also are heated to a temperature sufficient to maintain the first adhesive in a liquid state.

In still other embodiments of the system, the second adhesive comprises an adhesive material configured to exhibit a high tacking under cold weather conditions and the first adhesive comprises an adhesive material configured to form a seal following exposure to sunlight and heat.

In other aspects of the present disclosure, a method is provided. In embodiments, the method, comprises moving a web of shingle stock along a path; first, applying a first adhesive to a surface of the web of shingle stock using a first applicator assembly; and second, applying a second adhesive along the web of shingle stock. In embodiments, the first adhesive and the second adhesive each comprise a self-seal adhesive material having different, cooperative adhesive properties; and the first adhesive and the second adhesive are applied to the surface of the web of shingle stock so as to form a self-seal strip along the web of shingle stock.

In embodiments of the method, the first applying step comprises applying dots of the first adhesive. In addition, in embodiments, the second applying step comprises applying dots of the second adhesive within spaces defined between the first adhesive previously applied to the web of shingle stock.

In some embodiments, the second applying step comprises applying the second adhesive onto the dots of the first adhesive previously applied to the web of shingle stock.

In still other embodiments, the second applying step comprises applying dots of the second adhesive at locations spaced in a cross-wise direction across the web of shingle stock from the dots of the first adhesive.

In some embodiments of the method, the second applying step comprises moving the dots of the first adhesive applied to the web of shingle stock along a second applicator assembly and picking up a layer of the second adhesive along the dots of the first adhesive.

In some embodiments, the second applicator assembly comprises a puddle die configured to maintain a puddle of the second adhesive in a position adjacent the web of shingle stock, and moving the dots of the first adhesive applied to the web of shingle stock along the second applicator assembly further comprises moving the dots of the first adhesive through the puddle of the second adhesive.

In still other embodiments of the method, the first applicator assembly comprises a first applicator wheel, and the first applying step comprises applying the first adhesive to a surface of the first applicator wheel and rotating the surface of the first applicator wheel with the first adhesive applied thereto into engagement with the surface of the web of shingle stock.

In embodiments, the second applicator assembly comprises a second applicator wheel, and the second applying step comprises moving the web of shingle stock with the dots of the first adhesive applied thereto past the second applicator wheel, and rotating the second applicator wheel in synchronization with the first applicator wheel to apply dots of the second adhesive to the web of shingle stock along spaces between the dots of the first adhesive applied to the web of shingle stock by the first applicator wheel.

In other embodiments, the second applicator assembly comprises a second applicator wheel, and wherein the second applying step comprises moving the web of shingle stock with the dots of the first adhesive applied thereto past the second applicator wheel, and rotating the second applicator wheel in synchronization with the first applicator wheel to apply the second adhesive to the web of shingle stock on the dots of the first adhesive applied to the web of shingle stock by the first applicator wheel.

Thus, embodiments of systems and methods for application of sealant adhesive materials to a shingle stock material, which can include the application of different adhesives materials selected to provide different, synergistic or cooperative properties, are disclosed that are directed to the above discussed and other needs. The foregoing and other advantages and aspects of the embodiments of the present disclosure will become apparent and more readily appreciated from the following detailed description and the claims, taken in conjunction with the accompanying drawings. Moreover, it is to be understood that both the foregoing summary of the disclosure and the following detailed description are exemplary and intended to provide further explanation without limiting the scope of the present disclosure.

BRIEF DESCRIPTION OF THE DRAWINGS

The accompanying drawings, which are included to provide a further understanding of the embodiments of the present disclosure, are incorporated in and constitute a part of this specification, illustrate embodiments of this disclosure, and together with the detailed description, serve to explain the principles of the embodiments discussed herein. No attempt is made to show structural details of this disclosure in more detail than may be necessary for a fundamental understanding of the exemplary embodiments discussed herein and the various ways in which they may be practiced.

DETAILED DESCRIPTION

Figure 1:
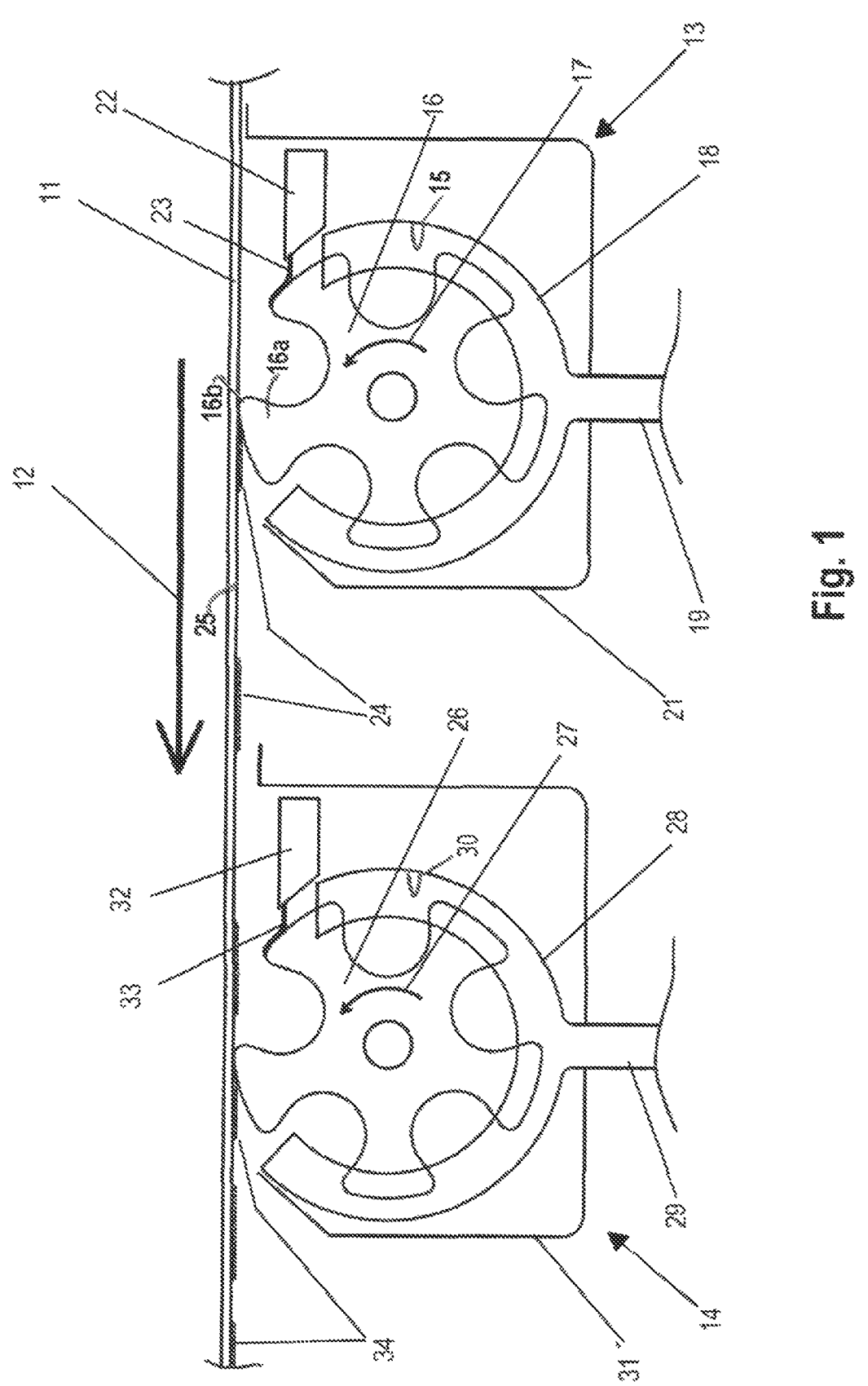
FIG. 1 is a side elevational view of an embodiment of a system for applying a self-seal strip comprising alternating dots of different adhesives to moving web of roofing shingle stock to form a self-seal strip of multi-adhesive, multi-property dots according to principles of the present disclosure.

FIG. 1 depicts a web of shingle stock 11 moving along a path in a processing direction 12 during manufacture, with the moving web of shingle stock 11 carried along its path by rollers or other conveyance system. In the embodiment shown in FIG. 1, a pair of applicator assemblies are arranged along the paths of travel of the moving web of shingle stock 11, including a first applicator wheel assembly 13 disposed beneath the moving shingle stock. A second applicator wheel assembly 14 is disposed beneath the moving shingle stock downstream of the first applicator wheel assembly 13. Each applicator wheel assembly may be similar to the applicator wheel assembly disclosed in U.S. Pat. No. 10,195,640 owned by the present applicant, the contents of which are hereby incorporated by reference. Generally speaking, the first applicator wheel assembly 13 includes a spoked first applicator wheel 16 mounted for rotation in a direction indicated by arrow 17. The second applicator wheel assembly 14 generally will have a similarly spoked second applicator wheel 26 that rotates in a direction indicated by arrow 27. The depicted first and second applicator wheels further are shown with five spokes, but applicator wheels with more or fewer spokes also are possible within the scope of the present disclosure.

For example, in some embodiments, each applicator wheel has 1 to 10 spokes. In other embodiments, each applicator wheel has 1 to 9 spokes. In other embodiments, each applicator wheel has 1 to 8 spokes. In other embodiments, each applicator wheel has 1 to 7 spokes. In other embodiments, each applicator wheel has 1 to 6 spokes. In other 5 embodiments, each applicator wheel has 1 to 5 spokes. In other embodiments, each applicator wheel has 1 to 4 spokes. In other embodiments, each applicator wheel has 1 to 3 spokes. In other embodiments, each applicator wheel has 1 to 2 spokes. In other embodiments, each applicator wheel has 2 to 10 spokes. In other embodiments, each applicator wheel has 3 to 10 spokes. In other embodiments, each applicator wheel has 4 to 10 spokes. In other embodiments, each applicator wheel has 5 to 10 spokes. In other embodiments, each applicator wheel has 6 to 10 spokes. In other embodiments, each applicator wheel has 7 to 10 spokes. In other embodiments, each applicator wheel has 8 to 10 spokes. In other embodiments, each applicator wheel has 6 to 10 spokes. In other embodiments, each applicator wheel has 2 to 9 spokes. In other embodiments, the applicator wheel has 3 to 8 spokes. In other embodiments, each applicator wheel has 4 to 7 spokes. In other embodiments, each applicator wheel has 5 to 6 spokes. In other embodiments, each applicator wheel has 1, 2, 3, 4, 5, 6, 7, 8, 9 or 10 spokes. In yet other embodiments, each applicator wheel has 10 to 20 spokes. In some embodiments, the number of spokes is based on a diameter of each applicator wheel, and can be different for each applicator wheel.

In some embodiments, the diameter of each applicator wheel is 12 inches to 42 inches. In some embodiments, the diameter of each applicator wheel is 16 inches to 42 inches. In some embodiments, the diameter of each applicator wheel is 20 inches to 42 inches. In some embodiments, the diameter of each applicator wheel is 24 inches to 42 inches. In some embodiments, the diameter of each applicator wheel is 30 inches to 42 inches. In some embodiments, the diameter of each applicator wheel is 36 inches to 42 inches. In some embodiments, the diameter of each applicator wheel is 12 inches to 36 inches. In some embodiments, the diameter of each applicator wheel is 12 inches to 30 5 inches. In some embodiments, the diameter of each applicator wheel is 12 inches to 24 inches. In some embodiments, the diameter of each applicator wheel is 12 inches to 20 inches. In some embodiments, the diameter of each applicator wheel is 12 inches to 16 inches. In some embodiments, the diameter of each applicator wheel is 16 inches to 36 inches. In some embodiments, the diameter of each applicator wheel is 20 inches to 10 inches. In some embodiments, the diameter of each applicator wheel is 12, 16, 20, 24, 30, 36, or 42 inches. In embodiments, the diameter of each applicator wheel further can be substantially equal to twice the distance from the center of each applicator wheel to the tip of a spoke.

In embodiments, each applicator wheel is comprised of steel and will be heated to help maintain the adhesive materials in the substantially liquid state during and after engagement of the applicator wheels with the shingle stock. In embodiments, each applicator wheel is heated by hot oil and/or electric heating. In yet other embodiments, each applicator wheel assembly 13/14 further is equipped with a scraper 15/30 that is configured to remove residual adhesive from the applicator wheel between adhesive applications. For example, in embodiments, the scrapers 15/30 can comprise blades or strips of a material such as high density polyethylene (HDPE), Teflon® (polytetrafluoroethylene), or a metal coated with a non-stick material. The scrapers can have a flexibility and/or be mounted so as to be biased into engagement with the lands of the spokes of the applicator wheels in a manner sufficient to scrape off residual adhesive and provide a substantially clean surface to the lands as they approach the adhesive dies 22/32. Such clearing of the remaining or residual adhesive materials from the surfaces of the lands of the applicator wheels helps enable a more consistent application of the adhesive materials thereto. Multiple scrapers also can be used at different locations about each applicator wheel.

Embodiments of the present disclosure further can enable a reduction in the size of the applicator wheel(s) due to the application of adhesive close to the point of contact with the shingle stock. The use of applicator wheels of a smaller size or which have spokes or lands with a reduced surface area or size, and heating of the applicator wheels further can serve to help dislodge and propel excess adhesive not applied to the shingle stock to a return chamber 18/28 for feeding back to the adhesive supply to be reused.

The applicator wheel 16 rotates so that the peripheral surfaces of its spokes 16a move at the line speed of the shingle stock 11 (or at some multiple of the line speed or some different speed). As shown in FIG. 1, the lands 16b of the spokes 16a are rotated upwardly and engage the bottom surface of the shingle stock 11. An adhesive die 22 is mounted adjacent the first applicator wheel 16. The adhesive die is configured to eject a stream of a first adhesive 23 fed from a supply onto the land 16b of each spoke 16a just before the spoke engages a side surface of the shingle stock 11. In various embodiments, the first adhesive 23 is deposited onto the shingle stock as each spoke engages the stock to form a linear array or pattern of first adhesive dots 24 along the length of the shingle stock. It will be understood that the term "dots" is not to be taken as limiting as to a size or configuration of the applied adhesive materials, and can include lines, strips, layers and/or other adhesive applications for forming self-seal adhesive strips. The first adhesive dots are separated by gaps or spaces 25 that can vary in size based on a size of the first adhesive dots 24, rate of movement of the shingle stock, applicator wheel speed, and potentially other factors.

The first applicator wheel 16 further rotates within a heated return chamber 18 that captures any adhesive that may be slung or drip off of the first applicator wheel as it rotates through its return chamber 18. A heated return conduit 19 delivers the captured adhesive back to a supply, where it is re-used for supplying the die 22. The first applicator wheel assembly 13 further may include a surrounding support structure 21 within which the first applicator wheel, return chamber, and die are disposed.

The second applicator wheel assembly 14 can have a construction substantially the same as the first applicator wheel assembly 13, except that it applies a second, different adhesive to the moving web of shingle stock 11 being conveyed thereabove. The second adhesive generally can be selected to have different yet cooperative or synergistic properties compared to the first adhesive, such as having a different tacking temperature than the first adhesive. The two adhesives also may have properties other than tacking temperature that are different.

As illustrated in FIG. 1, the second applicator wheel assembly 14 includes a heated rotating applicator wheel 26, shown with five spokes 26a that terminate at lands 26b along which the second adhesive is applied, and rotating in direction 27. The second applicator wheel 26 is shown in FIG. 1 as rotating in the same direction 27 as the direction of rotation 17 of the first applicator or wheel 16, but also can be rotated in an opposite direction to the direction of rotation of the first applicator wheel. A die 32 is fed with a flow of second adhesive from a supply, which second adhesive is ejected onto the lands of the spokes of the second applicator wheel 26. The second applicator wheel assembly 14, like the first applicator wheel assembly 13, also includes a return chamber 28 and a return conduit 29 that can be heated, one or more scrapers 30, and may be mounted within a support structure 31.

In embodiments, rotation of the second applicator wheel 26 is synchronized with rotation of the first applicator wheel 16 so that the second applicator wheel 26 deposits dots 34 of the second adhesive along the shingle stock 11 in the spaces 25 between dots 24 of the first adhesive. In other embodiments, the rotation of the second applicator wheel 26 is synchronized to apply dots of the second adhesive in other locations, including adjacent or along the dots 24 of the first adhesive. Synchronization of the first and second applicator wheels 16/26 may be accomplished in any appropriate manner such as, for example, mechanical gearing or electronic synchronization of drive motors by a controller among others. The ultimate result is the application of a self-seal strip to the shingle stock with different adhesives applied in a desired pattern that can consist of alternating dots of different adhesive materials having different tacking temperatures and/or other properties.

In embodiments, the second adhesive can include a self-seal adhesive material with a higher tackiness or an ability to adhere in colder weather or otherwise provide more aggressive engagement than the first adhesive (which can have a less aggressive engagement or tacking but provide a more permanent hold), and can be applied in a lesser or reduced amount compared to the application of the first adhesive. The second adhesive also can be applied in a ratio with respect to the first adhesive material of 1 to 4 or 1 to 3, or 1 to 2 or in other applications can be applied in a ratio 2 to 3. Each applicator wheel assembly also can operate at line speeds above speeds of 800 feet per minute, enabling the multi-adhesive self-seal strip to be applied at high line speeds with the system of FIG. 1.

The first and second adhesives 23 and 33 further can be applied in varying patterns or configurations along the surface of the moving web of shingle stock 11. For example, as noted above and as indicated in FIG. 1, the first and second adhesives can be applied in an alternating, "ABAB" type of pattern, with dots 24 of the first adhesive 23 (the "A" adhesive) alternating with dots 34 of the second adhesive 33 (the "B" adhesive). In other embodiments, other application patterns of the first and second adhesives can be provided, such as by varying the number of spokes of the first and second applicator wheels 16 and 26 and/or the speed of rotation the first and/or second applicator wheels to apply multiple dots of the first and/or second adhesives to the moving web of shingle stock. By way of example and not limitation, the first applicator wheel can be provided with additional spokes 16a and/or can be operated at a higher rate of rotation to apply more than one dot or strip of the first adhesive material to the moving web or shingle stock, while the second applicator wheel 26 can be provided with the same or different numbers of spokes 26a and/or can be operated at a similar or different rate of rotation than the first applicator wheel, to form an AAB, AAAB, an AABB or BBA patterns of the first and second adhesive dots along the web of shingle stock. Thus, the present disclosure is not limited simply to the application of the first and second adhesives in particular pattern, such as an ABAB type pattern.

Still further, in addition to the varying numbers of spokes of the first and second applicator wheels and controlling the rates of rotation of the first and/or second applicator wheels, the size and/or configuration of the lands 16b/26b of the spokes 16a/26a of the first and second applicator wheels 16/26 also can be varied to thus vary the size, shape and/or configurations of the adhesive dots applied to the moving web of shingle stock.

In still other embodiments, the first and second applicator wheel assemblies can be arranged along the path of the moving web of shingle stock 11 at varying locations, including being positioned at offset or misaligned locations. With such an offset alignment, the first and second adhesives can be applied to the moving web of shingle stock in offset lines or dots. By way of example, in one embodiment, the first and second applicator wheels can be arranged at different spacing's from a peripheral edge of the moving web of shingle stock, resulting in application of dots of the first and second adhesives at locations or positions laterally spaced across the shingle stock from one another. The applicator wheels also can have a reduced thickness such that, with a lateral spacing of, for example, approximately ³⁄₁₆ of an inch apart, the dots of the first and second adhesives together can form a self-seal strip of a desired thickness, length and width, e.g., a self-seal strip covering ³⁄₈ of an inch.

In still other embodiments, the first and second applicator wheels and can be arranged in a Z or cross-wise direction with respect to the path or processing path 12 of the moving web of shingle stock 11. In such an arrangement, the first and second adhesives can be applied to the moving web of shingle stock in a pattern whereby dots of the first adhesive are spaced inwardly from the peripheral edge of the shingle stock, and the second adhesive can be applied as dots offset cross-wise from and aligned with the spaces between the dots 24 of the first adhesive, or along the dots 24 of the first adhesive, between the first adhesive dots and the peripheral edge of the shingle stock.

In applications, the first and second adhesive materials will comprise different self-seal adhesive materials that typically will have different properties. The first and second adhesives further generally will be selected to provide different but complimentary, cooperative and/or synergistic properties and actions. For example, in embodiments, the second adhesive can be selected to provide an increased or higher level of tackiness or more aggressive hold or engagement, particularly under colder weather conditions, while the first adhesive can include self-seal adhesive materials that have a lower level or degree of tackiness and/or less compressibility, but which, after exposure to sun and heat, generally will form a more permanent seal or engagement of the shingles with a roof deck. As a result, roofing materials such as shingles can be formed with self-seal strips whereupon, when applied to a roof deck, the higher tacking second adhesives can engage and help hold the shingles against the roof deck, providing enhanced resistance to wind, as the first adhesives become fully sealed. The systems and methods of application of the first and second adhesives according to the principles of the present disclosure thus enable the application of different self-sealing adhesive materials to a moving web of shingle stock, with the first adhesive having first adhesive properties, while the second adhesive can have second adhesive properties that differ from the first adhesive properties, resulting in the formation of shingles or other roofing materials with multi-adhesive, multi-property self-seal strips; and which enables a balancing of synergetic or cooperative properties of different self-seal adhesives, including balancing cost, cold weather applications versus hot weather, different tacking, and/or other properties.

Figure 2:
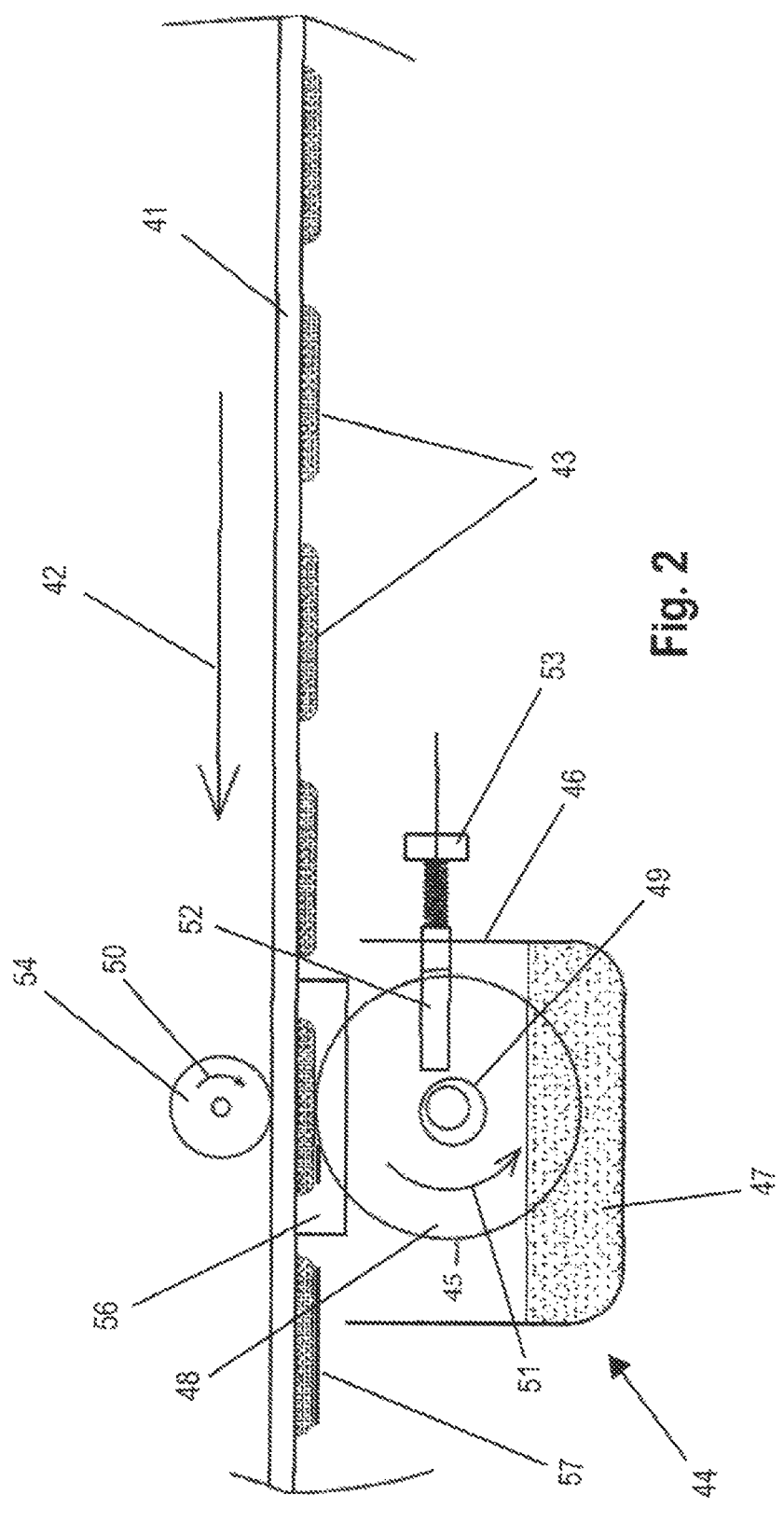
FIG. 2 is a side elevational view of another embodiment of a system for applying a second, different adhesive onto previously applied first adhesive dots to form a self-seal strip of multi-adhesive, multi-property dots according to principles of the present disclosure.
Figure 3:
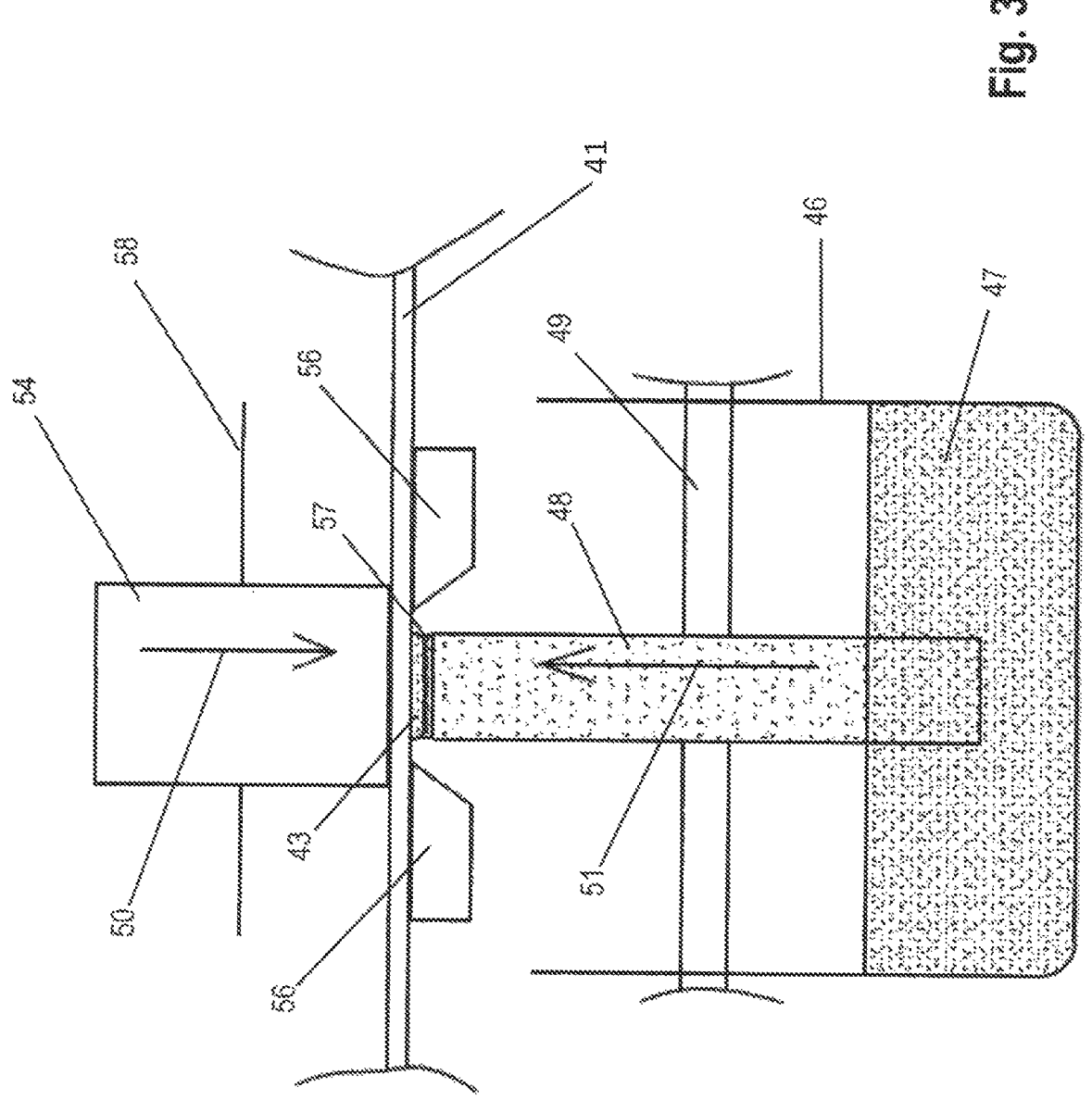
FIG. 3 is a rear elevational view of the system depicted in FIG. 2.

Another way to realize the benefits of two different adhesives in a self-seal strip is to apply a layer of a second adhesive onto the surface of dots made of a first adhesive. FIGS. 2 and 3 illustrate an embodiment of a system and method of accomplishing this at higher line speeds. Referring to both figures, a web 41 of shingle stock 11 is conveyed along a path in a processing direction 42. In this embodiment, adhesive dots 43 of a first adhesive material are shown having previously been applied to the shingle stock by a first applicator assembly at an upstream location. The first applicator assembly may, for example, be an apparatus such as that previously described. The shingle stock and linear array of first adhesive dots are conveyed to a second applicator assembly 44 having a heated sump or pan 46 carrying a supply of second adhesive 47 and an applicator wheel 48.

The applicator wheel 48 is shown rotating in a direction 51 and moves through the supply of second adhesive 47 at the bottom of its rotation. The applicator wheel 48 has a peripheral surface 45 configured to pick up a layer of second adhesive on its peripheral surface and, as it rotates, will carry this layer up and toward the moving shingle stock above. While the applicator wheel 48 is shown rotating in a direction indicated by arrow 51, the applicator wheel 48 also can be rotated in an opposite direction for application of the second adhesive.

A scraper fork 52 positioned adjacent the applicator wheel, and is adjustable with respect to the peripheral surface of the applicator wheel by an adjustment 53 mechanism (e.g., a biasing member) to scrape off excess adhesive from the peripheral surface 45 of the applicator wheel 48, leaving a desired substantially uniformly thick coating. The applicator wheel generally is heated and is mounted on an adjustable shaft mechanism 49 so that it can be finely adjusted in the vertical direction so as to just kiss the surfaces of the previously applied dots 43 of the first adhesive without touching the shingle stock. A stabilizing assembly that includes a stabilizing roller 54 rotating in direction 50 in conjunction with underlying guides 56 stabilizes the vertical position of the shingle stock and the previously applied dots 43 of the first adhesive as they pass the applicator wheel assembly 44.

As each of the previously applied dots of the first adhesive 43 is kissed by the peripheral surface of the applicator wheel 48, a layer 57 of the second adhesive is transferred from the applicator wheel 48 onto each of the dots of first adhesive. Each of the previously applied dots of the first adhesive further generally will be cooled, such as by passing the web of shingle stock through a cooler, by fans, or other cooling device to solidify the first adhesive dots to an extent sufficient to enable application of the second adhesive thereto. This forms a multi-layer adhesive dot having properties of both adhesives. For instance, where the adhesives have different tacking temperatures, one of the adhesives may quickly tack to an underlying shingle when installed and at a lower temperature, whereas the other may act to complete the adhesive bond when the temperature rises. FIG. 3 illustrates a stabilizing assembly comprising the stabilizing wheel 54 and guides 56 that stabilize the shingle stock and the dots of first adhesive 43 as the layer of second adhesive 57 is applied onto the previously applied dots of the first adhesive.

Figure 4:
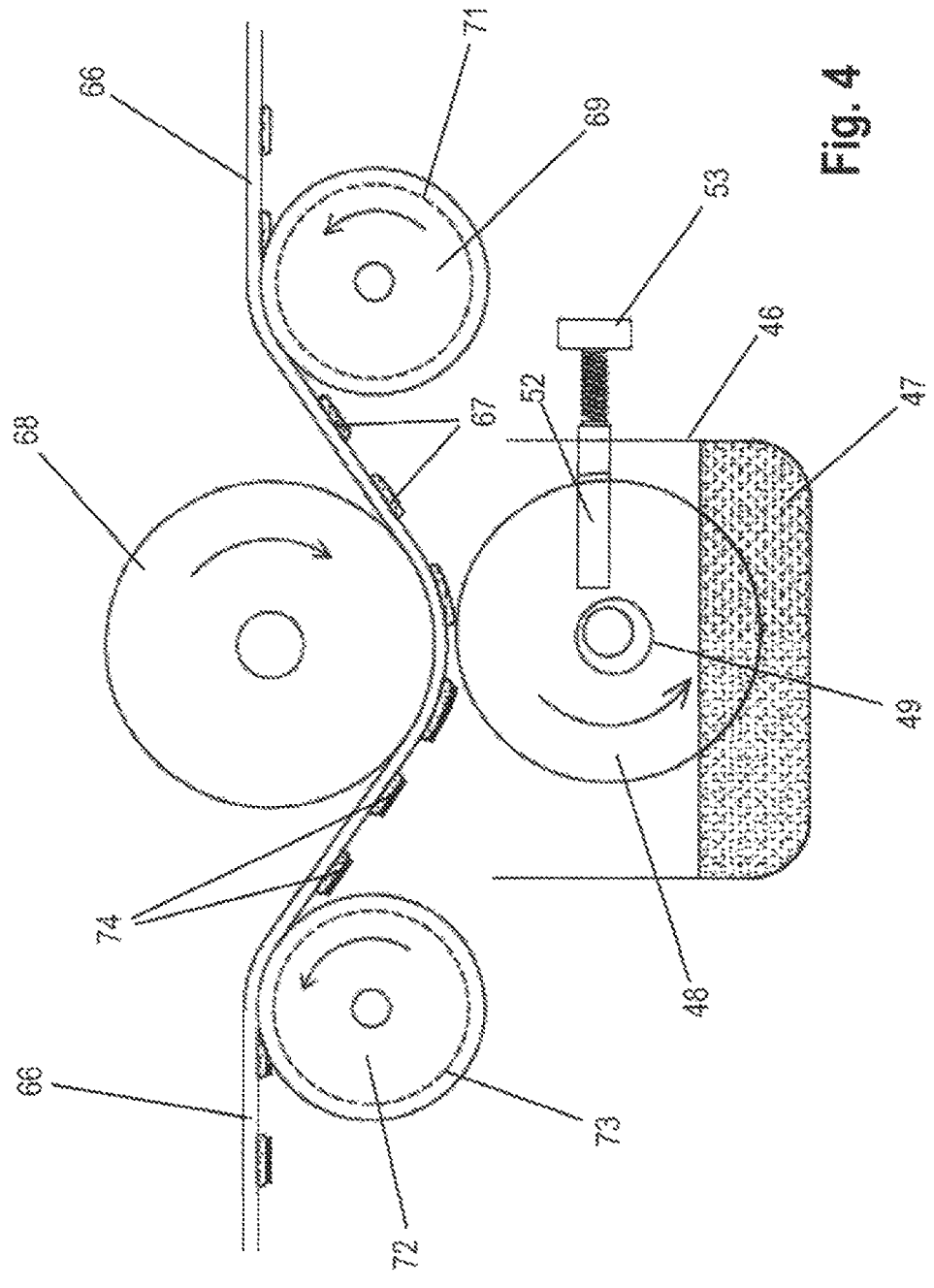
FIG. 4 is a side elevational view of another embodiment of a system for applying a second, different adhesive onto previously applied first adhesive dots to form a self-seal strip of multi-adhesive, multi-property dots according to principles of the present disclosure.

FIG. 4 illustrates an embodiment of another alternative system for stabilizing the shingle stock and positioning the existing adhesive dots for application of the layer of second adhesive. Here, an applicator wheel assembly as shown in the embodiment of FIGS. 2 and 3 can be used. For stabilization, the web of shingle stock 66 passes over an upstream grooved relief roller 69, under a main stabilizer wheel 68, and over a downstream grooved relief roller 72. The roller 69, the stabilizer wheel 68 and the roller 72 forming a stabilizer assembly. The moving web of shingle stock 66 has a linear array of previously applied dots 67 of a first adhesive. The grooved relief rollers 68 and 72 are formed with relief grooves 71 and 73 respectively through which the previously applied adhesive dots pass to avoid getting smashed. The rollers 69 and 72 tension the shingle stock as it moves below the main stabilizer wheel 68, being directed downwardly toward engagement with the applicator wheel assembly 46.

The applicator wheel assembly 46 is adjusted as described above so that the peripheral surface of its applicator wheel 48 just kisses each of the existing dots of first adhesive without touching the shingle stock. And, as in the previous embodiment, a layer of a second adhesive 74 is deposited onto the surface of each of the existing previously applied dots of first adhesive to create multi-layer adhesive dots each with dual properties, such as dual tacking temperatures, for example.

Figure 5:
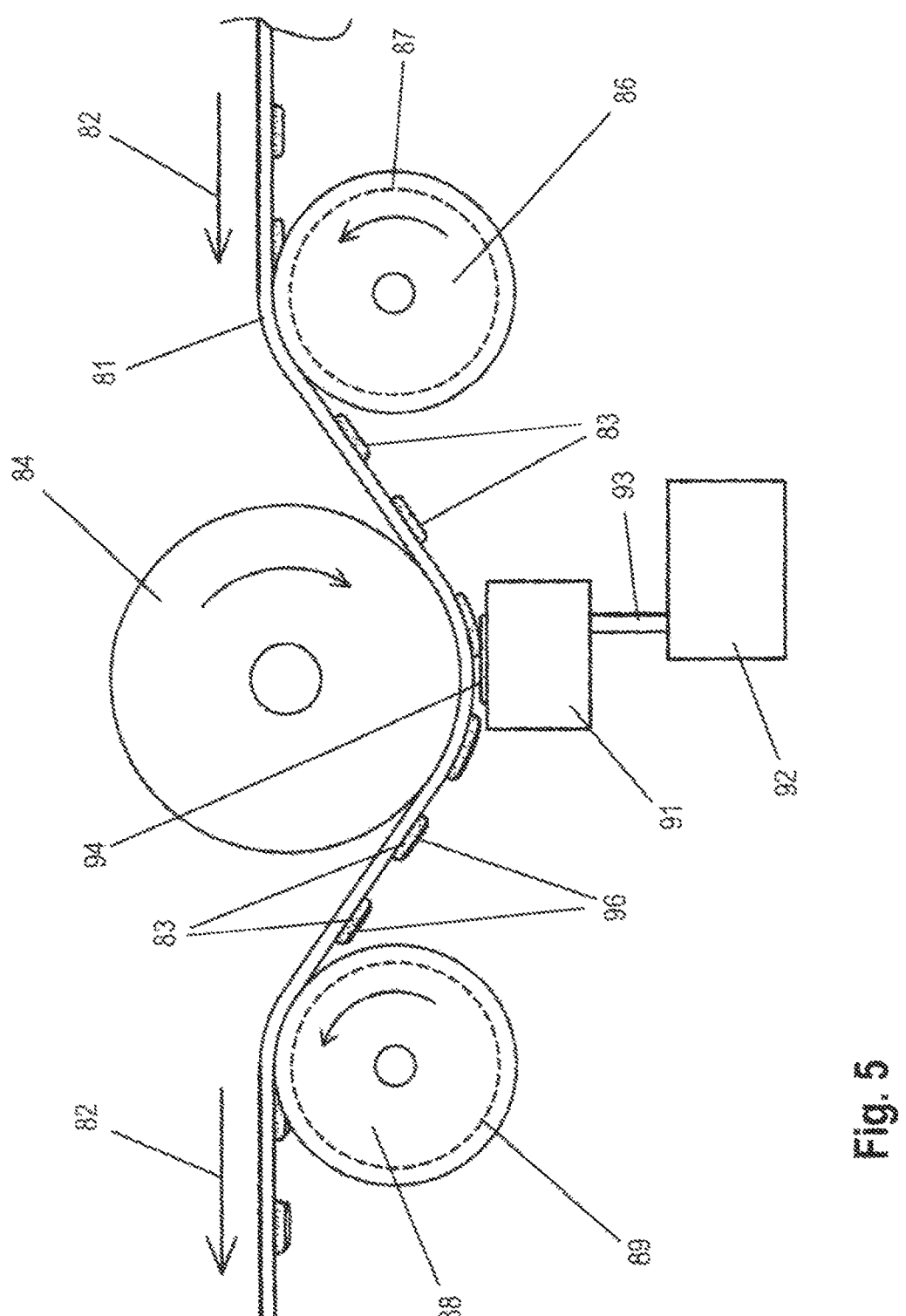
FIG. 5 is a side elevational view of an alternate embodiment of a system for applying a second, different adhesive onto previously applied first adhesive dots to form a self-seal strip of multi-adhesive, multi-property dots according to principles of the present disclosure.
Figure 6:
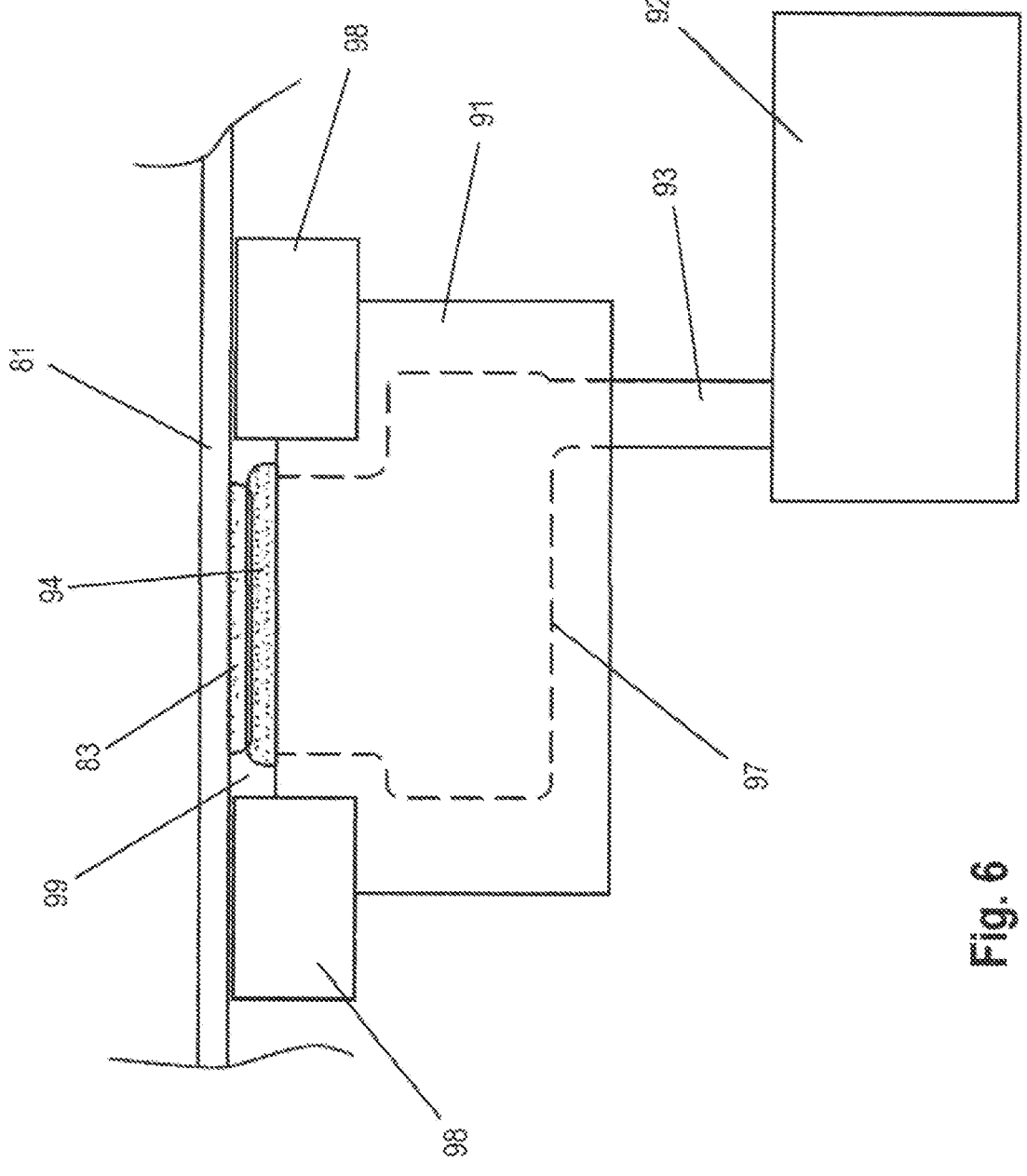
FIG. 6 is a rear elevational view of the system depicted in FIG. 5

FIGS. 5 and 6 illustrate yet another embodiment of a system and method for creating roofing materials such as shingles with applied self-seal strips comprising multi-layer dual function adhesive dots. In this embodiment, the stabilization system is substantially the same as described above relative to FIG. 4. The system includes two grooved relief rollers 86 and 87 having relief grooves 87 and 89 and a main stabilization wheel 84. The shingle stock 81 with previously applied adhesive dots 83 pass in direction 82 over rollers 86 and 88 and under the main stabilizer wheel 84.

In this embodiment, a puddle die 91 is disposed beneath the main stabilizer wheel 84 and is supplied through supply conduit 93 with the second adhesive from supply 92. The second adhesive is supplied to the puddle die 91 under controllable pressure. The pressure is controlled so that a small puddle 94 of the second adhesive is maintained on the top portion of the puddle die. The vertical position of the puddle die is carefully adjusted so that the puddle does not engage the shingle stock. As the previously applied dots of first adhesive 83 pass just above the puddle die, they are dragged through the standing puddle of second adhesive 94. As a result, a layer of the second adhesive is picked up by the previously applied dots of first adhesive forming multi-layer dots of the first adhesive 83 and the second adhesive 96.

In FIG. 6, the puddle die 91 has an internal cavity 97 through which the second adhesive moves before exiting at the mouth of the puddle die to form the puddle 94 of second adhesive. The pressure at which the second adhesive is delivered to the puddle die can be calibrated to maintain the puddle of adhesive at a predetermined desired thickness of 1 to 10 mils. as layers of the second adhesive are picked up by the previously applied dots of first adhesive 83. In some embodiments, the puddle die can be calibrated to maintain a puddle of adhesive at a thickness of 0.5 to 15 mils; 1 to 15 mils; 1 to 10 mils; 1 to 9 mils; 1 to 8 mils; 1 to 7 mils; 1 to 6 mils; 1 to 5 mils; 1 to 4 mils; 1 to 3 mils; 1 to 2 mils; 0.5 to 1 mils; and/or other thicknesses. In yet other embodiments, the puddle die can be calibrated to maintain a puddle of adhesive at a thickness of 2 to 15 mils; 3 to 15 mils; 5 to 10 mils; 7 to 10 mils; 9 to 10 mils; 3 to 10 mils; 5 to 15 mils; 7 to 15 mils; 10 to 15 mils; 12 to 15 mils; 14 to 15 mils; and/or other thicknesses. The delivery of adhesive to the die further can be adjusted to deliver a partial amount of adhesive to the beginning of the first dot and leave the first dot only partially covered by the second adhesive, allowing a partial exposure of both adhesives to the shingle material below during installation.

The foregoing description generally illustrates and describes various embodiments of the present disclosure. It will, however, be understood by those skilled in the art that various changes and modifications can be made to the above-discussed construction of the present disclosure without departing from the spirit and scope of the disclosure as disclosed herein, and that it is intended that all matter contained in the above description or shown in the accompanying drawings shall be interpreted as being illustrative, and not to be taken in a limiting sense. Furthermore, the scope of the present disclosure shall be construed to cover various modifications, combinations, additions, alterations, etc., above and to the above-described embodiments, which shall be considered to be within the scope of the present disclosure. Accordingly, various features and characteristics of the present disclosure as discussed herein may be selectively interchanged and applied to other illustrated and non-illustrated embodiments of the disclosure, and numerous variations, modifications, and additions further can be made thereto without departing from the spirit and scope of the present disclosure as set forth in the appended claims.

The invention claimed is:

1. A system, comprising:
   a conveyance system along which a web of shingle stock is moved along a path;
   a first applicator assembly positioned along the path of the web of shingle stock;
   the first applicator assembly configured to apply a linear array of dots of a first adhesive to the web of shingle stock, wherein the first applicator assembly comprises a first applicator wheel, the first applicator assembly being configured to apply the first adhesive to a surface of the first applicator wheel and rotate the surface of the first applicator wheel with the first adhesive applied thereto into engagement with the surface of the web of shingle stock; and
   a second applicator assembly positioned along the path of the web of shingle stock downstream from the first applicator assembly;
   the second applicator assembly configured to apply a second adhesive to the web of shingle stock along the linear array of dots of the first adhesive;
   wherein the first adhesive comprises a self-seal adhesive material having first adhesive properties and the second adhesive comprises a self-seal adhesive having second adhesive properties that are different from the first adhesive properties of the first adhesive; and
   wherein application of the first adhesive and the second adhesive forms a multi-adhesive self-seal strip having different adhesive properties along the web of shingle stock.

2. The system of claim 1, further comprising a stabilizer assembly located along the path of the web of shingle stock, the stabilizer assembly including a stabilizer wheel on one side of the web of shingle stock and aligned opposing supports on another side of the web of shingle stock.

3. The system of claim 2, wherein the stabilizer assembly further comprises a stabilizer wheel under which the web of shingle stock travels, flanked by a plurality of rollers over which the web of shingle stock travels.

4. The system of claim 1, wherein the first applicator wheel comprises a plurality of spokes configured to apply the dots of the first adhesive, and wherein the second applicator assembly comprises a second applicator wheel configured to rotate in synchronization with the first applicator wheel to apply the second adhesive to the web of shingle stock between the dots of the first adhesive applied to the web of shingle stock by the first applicator assembly.

5. The system of claim 1, wherein the first applicator wheel comprises a plurality of spokes configured to apply the dots of the first adhesive, and wherein the second applicator assembly comprises a second applicator wheel configured to rotate in synchronization with the first applicator wheel to apply the second adhesive to the web of shingle stock along the dots of the first adhesive applied to the web of shingle stock by the first applicator assembly.

6. The system of claim 1, wherein the second applicator assembly comprises a puddle die in communication with an adhesive supply, the puddle die including a top portion configured to maintain a puddle of the second adhesive in a position adjacent the web of shingle stock such that the dots of the first adhesive engage the puddle of the second adhesive to pick up a layer of the second adhesive as the dots of the first adhesive pass along the puddle die.

7. The system of claim 1, wherein the first applicator wheel comprises a plurality of spokes and an adhesive die configured to deposit the first adhesive onto each of the spokes of the first applicator wheel.

8. The system of claim 1, wherein the second applicator assembly comprises a second applicator wheel having a plurality of spokes and an adhesive die configured to deposit the second adhesive onto each of the spokes of the second applicator wheel.

9. The system of claim 1, wherein the second applicator assembly comprises a second applicator wheel and wherein the first applicator wheel, the second applicator wheel, or both are heated to a temperature sufficient to maintain the first adhesive in a liquid state.

10. The system of claim 1, wherein the second adhesive comprises an adhesive material configured to exhibit a high tacking under cold weather conditions and the first adhesive comprises an adhesive material configured to form a seal following exposure to sunlight and heat.

11. A method, comprising:

moving a web of shingle stock along a path;

applying a first adhesive to a surface of the web of shingle stock using a first applicator assembly, wherein the first applicator assembly comprises a first applicator wheel, and wherein the applying the first adhesive comprises applying the first adhesive to a surface of the first applicator wheel and rotating the surface of the first applicator wheel with the first adhesive applied thereto into engagement with the surface of the web of shingle stock; and applying a second adhesive along a surface of the web of shingle stock using a second applicator assembly;

wherein the first adhesive comprises a self-seal adhesive material having first adhesive properties and the second adhesive comprises another self-seal adhesive material having second adhesive properties that are different from the first adhesive properties of the first adhesive such that applying the first adhesive and the second adhesive forms a multi-adhesive self-seal strip having different adhesive properties along the web of shingle stock.

12. The method of claim 11, wherein the applying the first adhesive comprises applying dots of the first adhesive.

13. The method of claim 12, wherein the applying the second adhesive comprises applying dots of the second adhesive within spaces defined between the dots of the first adhesive previously applied to the web of shingle stock.

14. The method of claim 12, wherein the applying the second adhesive comprises applying the second adhesive onto the dots of the first adhesive previously applied to the web of shingle stock.

15. The method of claim 12, wherein the applying the second adhesive comprises applying dots of the second adhesive at locations spaced in a cross-wise direction across the web of shingle stock from the dots of the first adhesive.

16. The method of claim 12, wherein the applying the second adhesive comprises moving the dots of the first adhesive applied to the web of shingle stock along the second applicator assembly and picking up a layer of the second adhesive along the dots of the first adhesive.

17. The method of claim 16, wherein the second applicator assembly comprises a puddle die configured to maintain a puddle of the second adhesive in a position adjacent the web of shingle stock, and wherein moving the dots of the first adhesive applied to the web of shingle stock along the second applicator assembly further comprises moving the dots of the first adhesive through the puddle of the second adhesive.

18. The method of claim 11, wherein the second applicator assembly comprises a second applicator wheel, and wherein the applying the second adhesive comprises moving the web of shingle stock with dots of the first adhesive applied thereto past the second applicator wheel, and rotating the second applicator wheel in synchronization with the first applicator wheel to apply the dots of the second adhesive to the web of shingle stock along spaces between the dots of the first adhesive applied to the web of shingle stock by the first applicator wheel.

19. The method of claim 11, wherein the second applicator assembly comprises a second applicator wheel, and wherein the applying the second adhesive comprises moving the web of shingle stock with dots of the first adhesive applied thereto past the second applicator wheel, and rotating the second applicator wheel in synchronization with the first applicator wheel to apply the second adhesive to the web of shingle stock on the dots of the first adhesive applied to the web of shingle stock by the first applicator wheel.

20. A method, comprising:

moving a web of shingle stock along a path;

applying a first adhesive to a surface of the web of shingle stock using a first applicator assembly, wherein the applying the first adhesive comprises applying dots of the first adhesive; and applying a second adhesive along a surface of the web of shingle stock using a second applicator assembly;

wherein the applying the second adhesive comprises moving the dots of the first adhesive applied to the web of shingle stock along the second applicator assembly and picking up a layer of the second adhesive along the dots of the first adhesive, wherein the second applicator assembly comprises a puddle die configured to maintain a puddle of the second adhesive in a position adjacent the web of shingle stock, wherein moving the dots of the first adhesive applied to the web of shingle stock along the second applicator assembly further comprises moving the dots of the first adhesive through the puddle of the second adhesive, and wherein the first adhesive comprises a self-seal adhesive material having first adhesive properties and the second adhesive comprises another self-seal adhesive material having second adhesive properties that are different from the first adhesive properties of the first adhesive such that applying the first adhesive and the second adhesive forms a multi-adhesive self-seal strip having different adhesive properties along the web of shingle stock.

\* \* \* \* \*